US009621313B2

(12) United States Patent
Zhu et al.

(10) Patent No.: US 9,621,313 B2
(45) Date of Patent: Apr. 11, 2017

(54) HARDWARE AND SOFTWARE METHODOLOGIES FOR DYNAMIC RESOURCE ALLOCATION IN VIRTUALIZED FLEXIBLE-GRID OPTICAL NETWORKS

(71) Applicant: Futurewei Technologies, Inc., Plano, TX (US)

(72) Inventors: Jiafeng Zhu, San Ramon, CA (US); Weisheng Xie, Dallas, TX (US); Changcheng Huang, Ottawa (CA); Min Luo, San Jose, CA (US); Wu Chou, Basking Ridge, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 132 days.

(21) Appl. No.: 14/604,481

(22) Filed: Jan. 23, 2015

(65) Prior Publication Data
US 2016/0191219 A1 Jun. 30, 2016

Related U.S. Application Data

(60) Provisional application No. 61/930,889, filed on Jan. 23, 2014.

(51) Int. Cl.
*H04J 14/00* (2006.01)
*H04L 5/00* (2006.01)
*H04Q 11/00* (2006.01)

(52) U.S. Cl.
CPC ....... *H04L 5/0037* (2013.01); *H04Q 11/0066* (2013.01); *H04Q 2011/0086* (2013.01)

(58) Field of Classification Search
CPC . H04L 12/1432; H04L 47/762; H04L 47/826; H04L 43/0882; H04L 5/0037; H04L 12/1435; H04L 47/765; H04L 47/783; H04Q 11/0066; H04Q 2011/0086
USPC .......................................................... 398/45
See application file for complete search history.

(56) References Cited

U.S. PATENT DOCUMENTS

| | | | | |
|---|---|---|---|---|
| 6,230,016 | B1 * | 5/2001 | Benveniste | H04W 16/04 455/450 |
| 2006/0034438 | A1 * | 2/2006 | O'Neill | H04L 12/14 379/114.07 |
| 2012/0321306 | A1 * | 12/2012 | Wellbrock | H04J 14/021 398/48 |

(Continued)

*Primary Examiner* — Tesfaldet Bocure
(74) *Attorney, Agent, or Firm* — Futurewei Technologies, Inc.

(57) ABSTRACT

Embodiments of the present disclosure are directed to systems and methods for allocating spectrum of a flexible-grid optical network to a plurality of virtual links. Given a set of optical channels of different line rates and channel widths, a user can reserve one of the optical channels as a long-term reservation. The user can later elect to downgrade its optical channel to a smaller optical channel with lower line rate and less spectrum, for example, when the user's traffic demands decrease. The user may return (e.g., sell or de-allocate) an amount of unused spectrum to the carrier, and the carrier creates and manages a resource pool to gather unused spectrum from users. When the user's traffic increases, the user may obtain (e.g., purchase) additional spectrum from the carrier's resource pool and/or upgrade the user's optical channel to an optical channel having a higher line rate.

19 Claims, 10 Drawing Sheets

(56) References Cited

U.S. PATENT DOCUMENTS

| | | | |
|---|---|---|---|
| 2013/0045006 A1* | 2/2013 | Dahan | H04J 14/0257 398/34 |
| 2013/0086352 A1* | 4/2013 | Annepu | G06F 3/0605 711/170 |
| 2014/0007097 A1* | 1/2014 | Chin | G06F 9/45533 718/1 |
| 2015/0222386 A1* | 8/2015 | Patel | H04J 14/0256 398/48 |
| 2015/0295821 A1* | 10/2015 | Huang | H04Q 11/0066 398/49 |

* cited by examiner

HARDWARE AND SOFTWARE METHODOLOGIES FOR DYNAMIC RESOURCE ALLOCATION IN VIRTUALIZED FLEXIBLE-GRID OPTICAL NETWORKS

CROSS-REFERENCE TO RELATED APPLICATIONS

The present application claims priority to provisional application Ser. No. 61/930,889, filed on Jan. 23, 2014, entitled "SYSTEM AND METHOD OF DYNAMIC RESOURCE POOLING AND TRADING METHOD OF FLEXIBLE GRID OPTICAL NETWORK VIRTUALIZATION" naming the same inventors as in the present application. The contents of the above referenced provisional application are incorporated by reference, the same as if fully set forth herein.

FIELD

Embodiments of the present invention generally relate to the field of flexible grid optical network virtualization. More specifically, embodiments of the present invention relate to hardware and software methodologies for dynamic resource pooling and trading mechanisms within the field of optical network virtualization.

BACKGROUND

Heterogeneous and high performance applications require a high capacity, dynamic optical network. However, it is not scalable or feasible to configure and deploy an optical network for every type of application. Optical network virtualization is a key technology for enabling the deployment of various types of applications on a single optical network infrastructure. Current approaches to virtual optical networks allocate resources in an exclusive and often excessive manner. Typically a portion of the spectrum of the virtual optical network's peak traffic is reserved along the optical paths. This leads to higher user costs and lower revenue for the carrier.

The emergence of high-performance and heterogeneous applications such as cloud computing, big data, 3D gaming, etc., has challenged the capabilities of the Internet in its current inflexible form. For example, current approaches are not sufficiently scalable or dynamic to provision a dedicated network for each network-based application. Network virtualization has been used to improve the Internet by allowing multiple virtual networks to share a common substrate physical network. In optical network virtualization, the virtual optical networks (VONs) are composed through the partitioning and/or aggregation of physical optical network resources such as transponders, regenerators, fiber links, and spectrum slices.

Optical networks are evolving from fixed-grid based approaches, where an optical path's channel width follows a rigid standard, towards a flexible-grid optical network approach, where spectrum is allocated according to capacity and/or reachability requirements. Flexible-grid optical networks greatly improve spectrum efficiency. In a flexible-grid optical network, different optical channels may have different line rates and modulation formats which require different spectrum amounts, as shown in Table I.

TABLE I

| | Required Spectrum Amount | | | |
|---|---|---|---|---|
| | Line rate (Gbps) | | | |
| | 100 | 200 | 300 | 400 |
| Channel width (GHz) | 50 | 75 | 100 | 125 |

Complexities related to VON embedding or VON allocation play a vital role in the resource allocation of optical network virtualization. Regarding VON embedding, each VON provider (e.g., a user) requests certain resources and a physical optical network provider (e.g., the carrier) needs to allocate a part of its infrastructure resources to the VONs. Specifically, the carrier needs to map virtual nodes to physical optical nodes and map virtual links to physical optical paths. Previous approaches to VON embedding allocated resources exclusively and often excessively. For example, for a given virtual optical link, the exact spectrum amount of the link's peak traffic demand is reserved along the physical optical path. However, the spectrum utilization will be low when peak traffic demand rarely occur.

In order to increase spectrum efficiency of VONs, traditional fixed-grid optical networks are replaced by flexible-grid optical networks, where an optical channel may have flexible (e.g., variable) channel width. However, spectrum efficiency in optical network virtualization may remain undesirably low due to the fact that virtual optical networks reserve a spectrum amount based on peak traffic demands. The reserved spectrum is largely unused when peak traffic demands rarely occur.

Thus, a dynamic resource pooling and trading mechanism for optical network virtualization is needed and enables a "win-win" arrangement for carriers and their customers.

SUMMARY

Embodiments of the present invention are directed to systems and methods for allocating spectrum of a flexible-grid optical network to a plurality of virtual links. Given a set of optical channels of different line rates and channel widths, a user can reserve one of the optical channels as a long-term reservation. The user can later elect to downgrade its optical channel to a smaller optical channel with lower line rate and less spectrum, for example, when the user's traffic demands decrease. The user may return (e.g., sell or de-allocate) an amount of unused spectrum to the carrier, and the carrier creates and manages a resource pool to gather unused spectrum from users. When the user's traffic increases, the user may obtain (e.g., purchase) additional spectrum from the carrier's resource pool and/or upgrade the user's optical channel to an optical channel having a higher line rate.

In one embodiment, an apparatus for allocating resources in a flexible-grid optical network is described. The apparatus includes a first virtual link of a virtual optical network coupled to a physical network terminal, a second virtual link of the virtual optical network coupled to the physical network terminal, and a controller coupled to the physical network terminal. The controller is configured to allocate a first spectrum of an optical channel to the first virtual link, allocate a second spectrum of the optical channel to the second virtual link, allocate all or part of a first unused spectrum of the first spectrum to a resource pool, and allocate all or part of an available spectrum of the resource pool to the second virtual link.

In another described embodiment, a method of managing resources in network virtualization over a flexible-grid optical network is detailed. The method involves allocating a first portion of a spectrum to a first link, allocating a second portion of the spectrum to a second link, de-allocating a third portion of an allocated spectrum, wherein the third portion becomes part of a resource pool comprising available spectrum, and allocating a fourth portion of available spectrum of the resource pool to the first or second link.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a virtual optical network. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a virtual optical network, or similar electronic computing device, that manipulates and transforms data represented as physical (electronic) quantities within the virtual optical network's registers and memories into other data similarly represented as physical quantities within the virtual optical network or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Hardware and Software Methodologies for Dynamic Resource Allocation in Virtualized Flexible-Grid Optical Networks To address the issues and limitations discussed above, embodiments of the present invention use dynamic resource pooling and trading mechanisms in which users do not need to reserve a spectrum amount based on peak traffic demands. Aspects of the mechanisms disclosed herein have been modeled as a Stackelberg game, and the Subgame Perfect Equilibrium for the mechanisms have been determined so that user costs and carrier revenues associated with the dynamic mechanism are comparable to the traditional exclusive resource allocation mechanisms. As a result, the dynamic mechanisms described herein can save user costs while increase carrier revenue under certain conditions.

According to some embodiments of the present invention, given a set of optical channels of different line rates and channel widths, a user can reserve one of the optical channels as a long-term reservation. The user can use all of the spectrum amount of its chosen optical channel at any time. The user can later elect to downgrade its optical channel to a smaller optical channel with lower line rate and less spectrum, for example, when the user's traffic demands decrease. The user may return (e.g., sell or de-allocate) an amount of unused spectrum to the carrier, and the carrier creates and manages a resource pool to gather unused spectrum from users. When the user's traffic increases, the user may obtain (e.g., purchase) additional spectrum from the carrier's resource pool and/or upgrade the user's optical channel to an optical channel having a higher line rate.

Aspects of the proposed mechanisms may be formulated as a Stackelberg game. The Subgame Perfect Equilibrium (SPE) has been determined and the numerical results are shown to illustrate the benefits of the new mechanisms under the following assumptions: 1) Traffic splitting is not allowed. A user can only have one optical channel for each virtual link at any time as splitting the traffic is not cost-effective; 2) The user does not intentionally occupy more of the spectrum than is necessary to accommodate its traffic. In other words, the user uses the optical channel which is larger than and closest to its traffic demand; and 3) The optical channel's wavelength may be changed by spectrum conversion.

Resource Pooling and Trading

According to some embodiments of the present invention, an optical channel's configuration includes at least two parameters: line rate and channel width. The variables $l_i$ and $w_i$ are used to represent the line rate and the channel width of configuration i's optical channel. It is appreciated that a user's traffic may fluctuate over time. In one example, a user purchases an optical channel of configuration y at a certain price rate u (per GHz and per unit time). The user may occupy the spectrum up to $w_y$ at the guaranteed price rate u at any time. Configuration y's optical channel is referred to as the wholesale optical channel, its channel width $w_y$ as the wholesale spectrum, and the guaranteed price rate u as wholesale rate.

When the user's traffic is low, the spectrum required may be less than the wholesale spectrum $w_y$. The difference between the wholesale spectrum $w_y$ and the user's required spectrum is referred to as the unused spectrum. The user can return (e.g., sell or de-allocate) all or part of the unused spectrum to the carrier at a reduced price rate $\alpha u$, $0 \leq \alpha \leq 1$. The ratio $\alpha$ is referred to as the reduced rate ratio. The users and the carrier may negotiate the reduced rate ratio $\alpha$ value, or the reduced rate ratio $\alpha$ value may be a predetermined value. The carrier places the unused spectrum in a resource pool. The other users that share the same fiber as the user selling the unused spectrum may purchase the unused spectrum as needed. According to some embodiments, the carrier's unsold spectrum is also available in the resource pool.

When the user's traffic demands require more spectrum than is available in the wholesale spectrum $w_y$, the user may purchase extra spectrum to accommodate its traffic demand. The user may purchase spectrum in the resource pool from the carrier at an increased price rate $\beta u$, where $\beta \geq 1$. The ratio $\beta$ is referred to as the reselling rate ratio. It is possible that not enough spectrum is available in the resource pool for the combined spectrum demands of all buyers, and thus congestion occurs. The user and the carrier may negotiate a congestion probability in a service-level agreement ("SLA") and set prices accordingly.

Figure 1A:
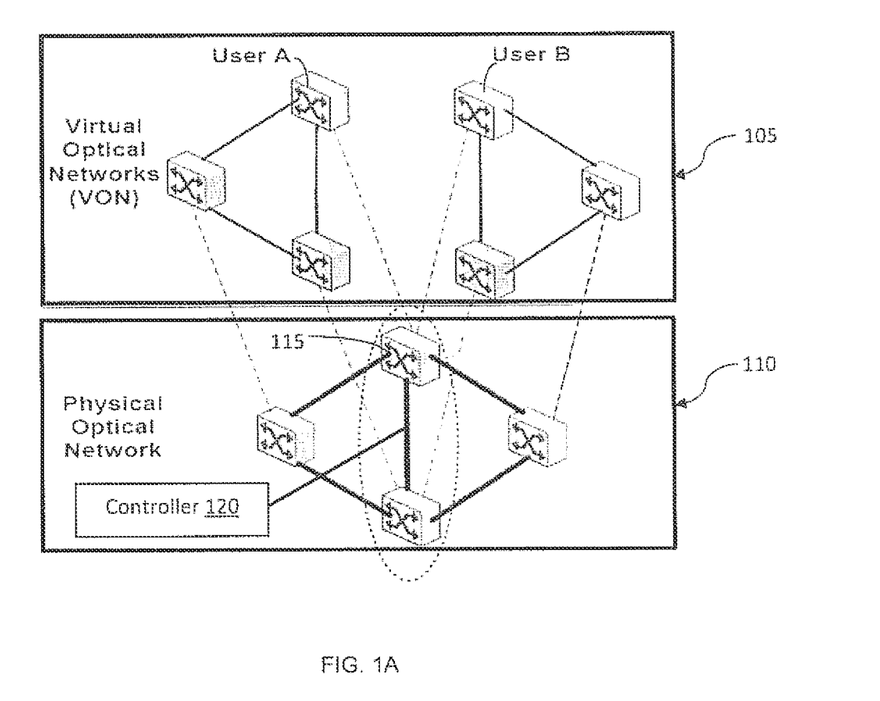
FIG. 1A is a diagram illustrating an exemplary virtual optical network and a corresponding exemplary physical optical network according to embodiments of the present invention.
Figure 8:
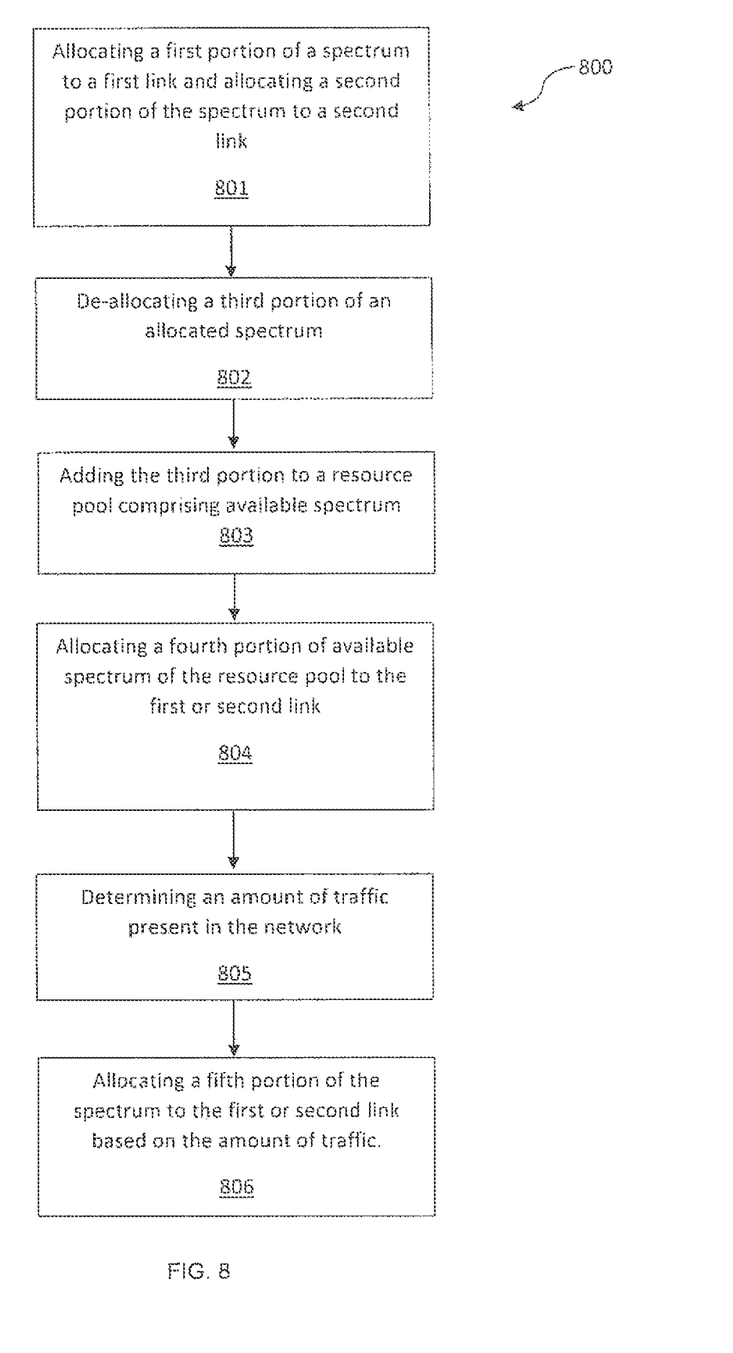
FIG. 8 is a flowchart depicting an exemplary sequence of computer implemented steps for a process of allocating virtual resources in a flexible-grid optical network according to embodiments of the present invention.

With regard to FIG. 1A, a diagram illustrating an exemplary virtual optical network 105 and a corresponding exemplary physical optical network 110 is depicted according to embodiments of the present invention. An exemplary sequence of computer implemented steps 800 for allocating and managing resources in a flexible-grid optical network according to embodiments of the present invention is depicted in FIG. 8 and described herein concurrently with FIGS. 1A-1C. As depicted in FIG. 1A, User A and User B share a common physical fiber represented by the dashed lines to physical optical network component 115.

Figure 1B:
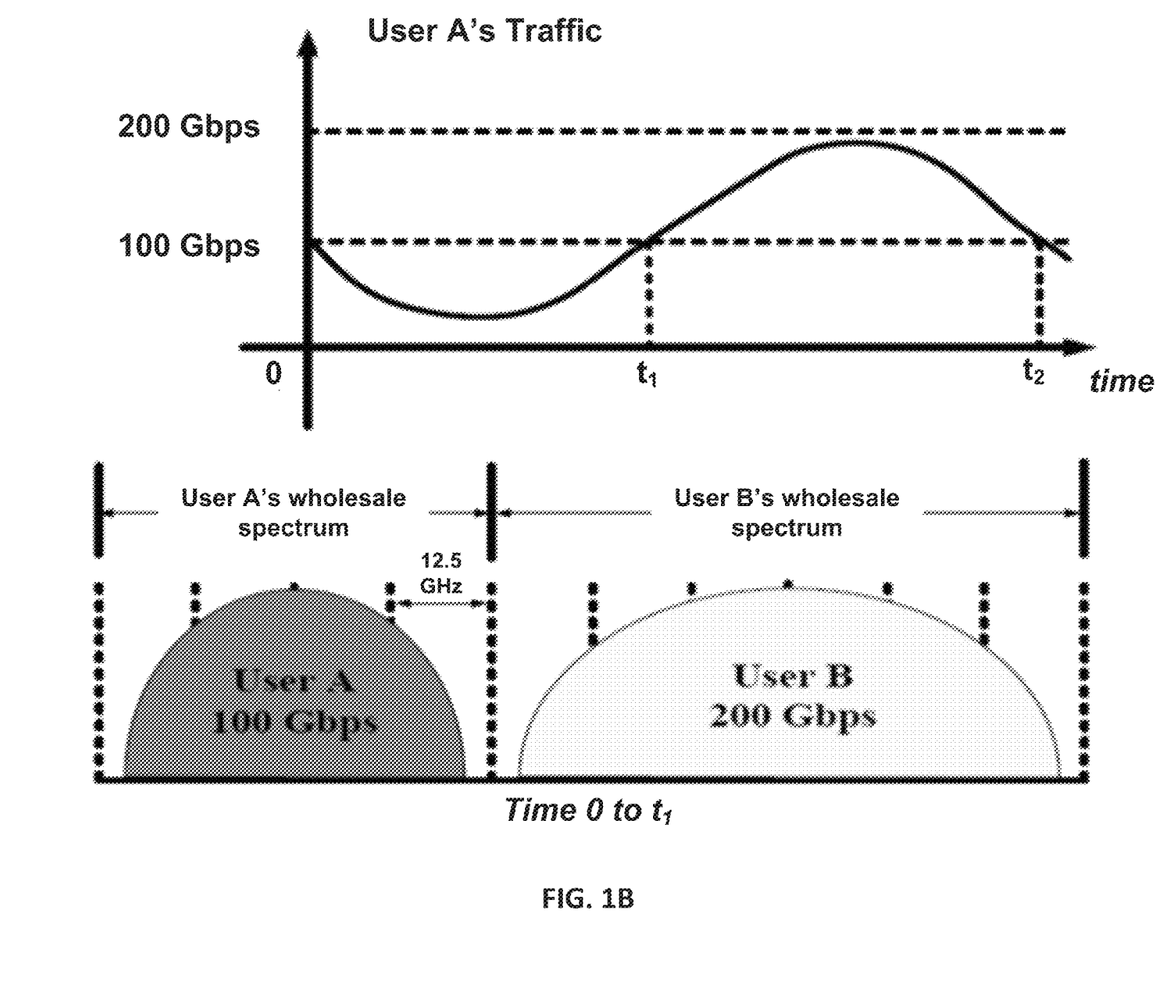
FIG. 1B is a diagram illustrating exemplary spectrum allocation for User A and User B of a virtual optical network according to embodiments of the present invention.
Figure 1C:
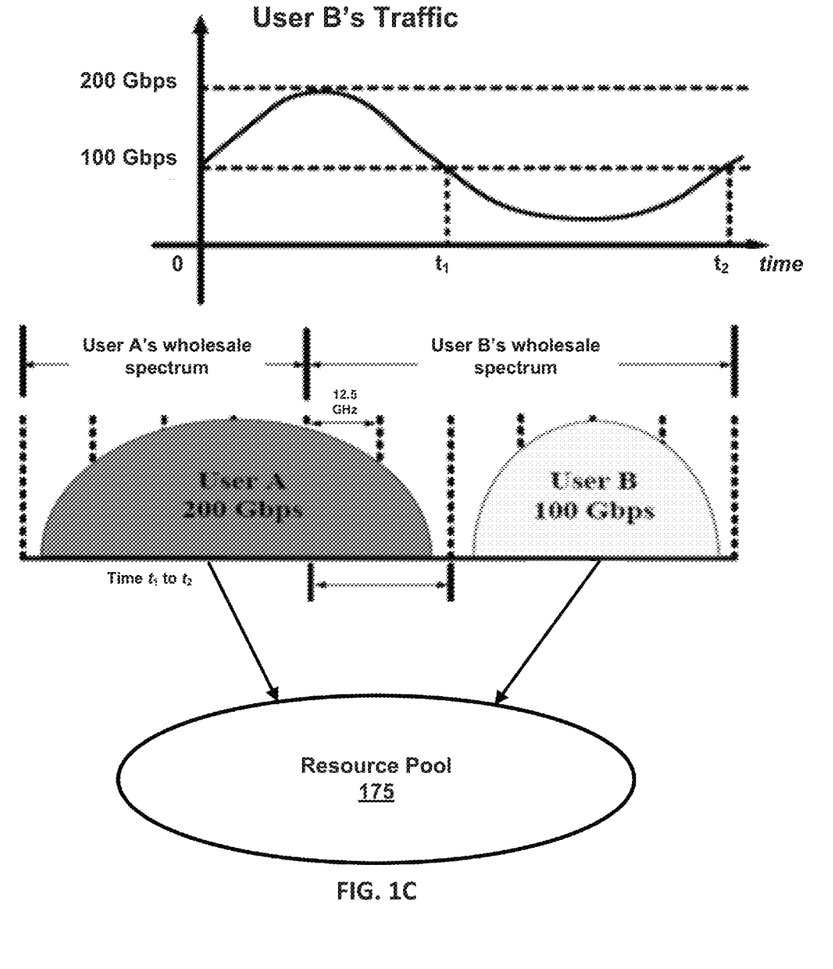
FIG. 1C is a diagram illustrating an exemplary shared resource pool and exemplary spectrum allocation for User A and User B of a virtual optical network according to embodiments of the present invention.

FIGS. 1B and 1C illustrate exemplary wholesale spectrum allocation of User A and User B according to embodiments of the present invention. Controller 120 comprises a CPU and a network interface and is coupled to physical optical network 110. Controller 120 is used to configure spectrum allocation among the users of virtual optical network 105 and manage resource pool 175 (depicted in FIG. 1C). User A chooses a 100 Gbps optical channel with a 50 GHz channel width as its wholesale optical channel using controller 120, and User B chooses a 200 Gbps optical channel with a channel width of 75 GHz using controller 120 (step 801). With regard to FIG. 1B, from time 0 to $t_1$, the traffic demands of both User A and User B can be accommodated by their wholesale spectrum amount 150 so no reselling occurs.

With regard to FIG. 1C, from time $t_1$ to $t_2$, User B switches to a 100 Gbps optical channel and has 25 GHz of unused spectrum using controller 120. User B sells the unused spectrum to the carrier (step 802). The unused spectrum joins resource pool 175 using controller 120 (step 803). At the same time, User A needs 25 GHz of extra spectrum and purchases the spectrum from resource pool 175 (step 804). User A and User B do not need to purchase long-term spectrum amount for their peak traffic demands. Instead, the user purchases certain amount of wholesale spectrum 150 at the beginning, and purchases extra spectrum 170 only when needed.

According to some embodiments of the present invention, an amount of traffic present in the network is determined (step 805). Based on the amount of traffic, a new portion of spectrum may be allocated to avoid congestion. For example, a portion of spectrum may be allocated to User A or User B based on the amount of traffic in the network (step 806).

As described above, a user may reduce overall costs by selling all or part of their unused spectrum. The carrier can generate higher revenue because it can support more users by reselling unused spectrum. Furthermore, the carrier earns the difference between the higher price rate $\beta u$ and the lower price rate $\alpha u$. In the following sections, this "win-win" situation is demonstrated using theoretical analysis.

Two-Stage Stackelberg Game Analysis

An exemplary network virtualization scenario is described with one carrier and a set of users. One proposed allocation mechanism is formulated as a two-stage Stackelberg game. The carrier is the "leader" in the Stackelberg game, while the users are the "followers".

In Stage I, the carrier first determines a reselling rate ratio $\beta$ that maximizes its revenue and announces it to the users.

In Stage II, each user determines its wholesale optical channel's configuration that minimizes its long-term cost. The two-stage Stackelberg game can be analyzed by exploiting the subgame perfect equilibrium (SPE). Backward induction is a general technique for determining the SPE (start with Stage II, then proceed to Stage I). Each of these two stages can be formulated as an independent optimization problem. Next, the SPE will be determined and show that the "win-win" situation exists under SPE. The notations used in the analysis are shown in Table. II.

TABLE II

| Symbol | Meaning |
| --- | --- |
| u | Wholesale rate |
| x | User's traffic demand |
| y | Configuration of wholesale optical channel |
| $l_i$ | Line rate of configuration i's optical channel |
| $w_i$ | Channel width of configuration i's optical channel |
| α | Reduced rate ratio |
| β | Reselling rate ratio |
| C | The total spectrum amount of a fiber |
| N | The number of users sharing a fiber |
| X | The random variable representing user's traffic |
| λ | The parameter of the user's traffic distribution |
| b | The peak rate of the user's traffic |
| T | The total time period |
| $P_{new}$ | The total cost a user pays to the carrier using the new mechanism |
| $P_{old}$ | The total cost a user pays to the carrier using the old mechanism |
| $P_{new\_avg}$ | The average cost a user pays to the carrier using the new mechanism |
| $P_{old\_avg}$ | The average cost a user pays to the carrier using the old mechanism |
| $R_{new\_avg}$ | The average revenue of the carrier using the new mechanism |
| $R_{old\_avg}$ | The average revenue of the carrier using the old mechanism |

In the following sections, the "new mechanism" refers to a dynamic resource pooling and trading mechanism according to embodiments of the present invention, while the "old mechanism" refers to a traditional exclusive resource allocation mechanism.

Determining Wholesale Optical Channel

This section describes how to determine the SPE through backward induction. The first portion describes how the users determine their wholesale optical channels to minimize their cost according to embodiments of the present invention. The second portion shows how the carrier determines the reselling rate ratio β to maximize its revenue according to embodiments of the present invention.

In Stage II, the user decides the wholesale optical channel to minimize its cost, given the reselling rate ratio β announced by the carrier in Stage I. Assuming the user's traffic follows the truncated exponential distribution with parameters λ and b, the probability density function (pdf) is:

$$f_X(x) = \frac{\lambda e^{-\lambda x}}{1 - e^{-\lambda b}}, 0 \leq x \leq b \quad (1)$$

This assumption of traffic distribution obtains closed-form cumulative density function of the user's traffic demand. The new mechanism does not depend on any particular traffic distribution. Truncated exponential distribution is used herein for simplifying the analysis, and it is assumed that the set of line rates are in ascending order, that is, $l_j > l_i$ and $w_j > w_i$, $\forall j > i$, $l_0 = 0$. It is also assumed that the peak traffic demand b can be accommodated by the optical channel of configuration L.

The user cost $P_{new}$ under the new mechanism over a time period T can be obtained by the following formula:

$$P_{new}(\beta, y) = w_y uT - \alpha uT \Sigma_{i=1}^{y-1}(w_y - w_i) \int_{l_{i-1}}^{l_i} f_X(x)dx + \beta uT \Sigma_{i=y+1}^{L}(w_i - w_y) \int_{l_{i-1}}^{l_i} f_X(x)dx, y \in \{1, 2, \ldots, L\} \quad (2)$$

The first part of the formula is the total payment for the wholesale spectrum, the second part is the income of the user from selling the unused spectrum, and the third part is the total payment for buying the extra spectrum from the carrier.

$$\text{Let } P_{new\_avg}(\beta, y) = \frac{P_{new}(\beta, y)}{uT}, \text{ then} \quad (3)$$

$$P_{new\_avg}(\beta, y) = w_y - \alpha \sum_{i=1}^{y-1}(w_y - w_i) \int_{l_{i-1}}^{l_i} f_X(x)dx + \beta \sum_{i=y+1}^{L}(w_i - w_y) \int_{l_{i-1}}^{l_i} f_X(x)dx,$$

$$y \in \{1, 2, \ldots, L\}$$

They value that minimizes the user cost is described as:

$$y^*(\beta) = \arg \min_{y \in \{1, 2, \ldots, L\}} P_{new\_avg}(\beta, y) \quad (4)$$

If the wholesale spectrum amount is less than $w_y^*$, the user may have to pay more for the extra spectrum. If the wholesale spectrum amount is larger than $w_y^*$, the user pays less for the extra spectrum, but there will be more unused spectrum and the penalty of reselling the unused spectrum is larger.

Finally, the minimum average user cost under the new mechanism is determined by and can be expressed as:

$$P^*_{new\_avg}(\beta) = w_y^* - \alpha \Sigma_{i=1}^{y^*-1}(w_y^* - w_i) \int_{l_{i-1}}^{l_i} f_X(x)dx + \beta \Sigma_{i=y^*+1}^{L}(w_i - w_y^*) \int_{l_{i-1}}^{l_i} f_X(x)dx \quad (5)$$

In the old mechanism, the user purchases wholesale spectrum amount at its peak traffic demand, which is in this case. Thus, the user cost using the old mechanism is:

$$P_{old} = w_L uT \quad (6)$$

Similar to $P_{new\_avg}$, let $P_{old\_avg} = \frac{P_{old}}{uT}$, we have $$P_{old\_avg} = w_L$$

Determining Reselling Rate Ratio

In Stage I, the carrier needs to determine the reselling rate ratio β to maximize its total revenue. For simplifying the analysis, without loss of generality, it is assumed that all the users follow the same truncated exponential distribution with the same parameters λ and b. Also, the traffic distributions of different users are independent. Assume the traffic demands of User 1, User 2, . . . , User n are represented as random variables X1, X2, . . . , Xn, and their corresponding required spectrum amounts are represented by Z1, Z2, . . . , Zn. Then the sequence of variables {Z1, Z2, . . . , Zn} is independent and identically distributed (i.i.d).

The carrier needs to solve the following problem, where $N_{new}(\beta)$ is the number of users the carrier can accommodate under β using the new mechanism:

$$\beta^* = \arg \max_{\beta \geq 1} R_{new\_avg}(\beta) = \arg \max_{\beta \geq 1} N_{new}(\beta) P^*_{new\_avg}(\beta) \quad (7)$$

When β is small, the carrier earns less from reselling the unused spectrum. On the other hand, when β is large, the number of users the carrier can accommodate is smaller. This is due to that fact that $w_{y^*}$ is larger when $\beta$ is larger, and the carrier has to guarantee each user's wholesale spectrum amount $w_{y^*}$ under given capacity C, i.e., $N_{new}(\beta)w_y^* \leq C$. Thus $N_{new}(\beta)$ becomes smaller when $\beta$ increases. From the analysis above, there should be a $\beta$ which maximizes the carrier revenue.

In the old mechanism, the user buys the same spectrum amount as its peak traffic demand and it does not sell out the unused spectrum. Thus, $N_{old}$ is obtained by:

$$N_{old} = \left\lfloor \frac{C}{w_L} \right\rfloor \qquad (9)$$

In the new mechanism, the carrier buys the unused spectrum from one user and sells it to other users in need. Thus, the new mechanism may support more users than the old mechanism. However, the multiplexing of users in the new mechanism may result in congestion, while there is no congestion in the old mechanism. In order to make the new mechanism and old mechanism comparable, the congestion probability must be limited to a very small value such that it is negligible.

To measure the congestion probability, the distribution of the aggregated spectrum amount of all users must first be analyzed. The aggregated spectrum amount of n users is denoted by a random variable $S_n$ (e.g., $S_n = Z_1 + Z_2 + \ldots + Z_n$). According to the classical central limit theorem, given that $\{Z_1, Z_2, \ldots, Z_n\}$ is a sequence of i.i.d random variables with $E[Z_i] = \mu$ and $Var[Z_i] = \infty$, then as n is approaching infinity, the random variable $S_n$ converges to a normal distribution $N(n\mu, n\sigma^2)$. The mean value of random variable $Z_i$ is given by:

$$\mu = \Sigma_{i=1}^L w_i \int_{l_{i-1}}^{l_i} f x(x) dx \qquad (10)$$

and the variance is:

$$\sigma^2 = \Sigma_{i=1}^L w_i^2 \int_{l_{i-1}}^{l_i} f x(x) dx - \mu^2 \qquad (11)$$

Assuming a large number of users, $S_n$ then approximately follows the normal distribution $N(n\mu, n\sigma^2)$. According to the 68-95-99.7 rule, approximate 99.7% of the values of $S_n$ lie within 3 standard deviations of the mean, i.e., $$\text{Prob}(n\mu - 3\sqrt{n}\sigma \leq s_n \leq n\mu + 3\sqrt{n}\sigma) \approx 0.9973$$

And therefore, $\text{Prob}(s_n \leq n\mu + 3\sqrt{n}\sigma) \approx 0.999$. Thus, if $n\mu + 3\sqrt{n}\sigma \leq C$, then the congestion probability is at most 0.1%, which is negligible. Meanwhile, the carrier has to guarantee each user's wholesale spectrum amount $w_{y^*}$ at any time (e.g., $nw_{y^*} \leq C$). Together there are two constraints for $N_{new}(\beta)$, both of which need to be satisfied:

$$N_{new}(\beta) \leq \left\lfloor \left(\frac{-3\sigma + \sqrt{9\sigma^3 + 4\mu C}}{2\mu}\right)^2 \right\rfloor \qquad (12)$$

$$N_{new}(\beta) \leq \left\lfloor \frac{c}{w_{y^*}} \right\rfloor \qquad (13)$$

And overall:

$$N_{new}(\beta) = \min\left(\left\lfloor \left(\frac{-3\sigma + \sqrt{9\sigma^3 + 4\mu C}}{2\mu}\right)^2 \right\rfloor, \left\lfloor \frac{c}{w_{y^*}} \right\rfloor\right) \qquad (14)$$

Finally, the maximum carrier revenue under the new mechanism is:

$$R^*_{new\_avg} = N_{new}(\beta^*) P^*_{new\_avg}(\beta^*) \qquad (15)$$

The maximum carrier revenue under the old mechanism is:

$$R_{old\_avg} = N_{old} P_{old\_avg} = \left\lfloor \frac{C}{w_L} \right\rfloor w_L \qquad (16)$$

User Cost and Carrier Revenue

Figure 2:
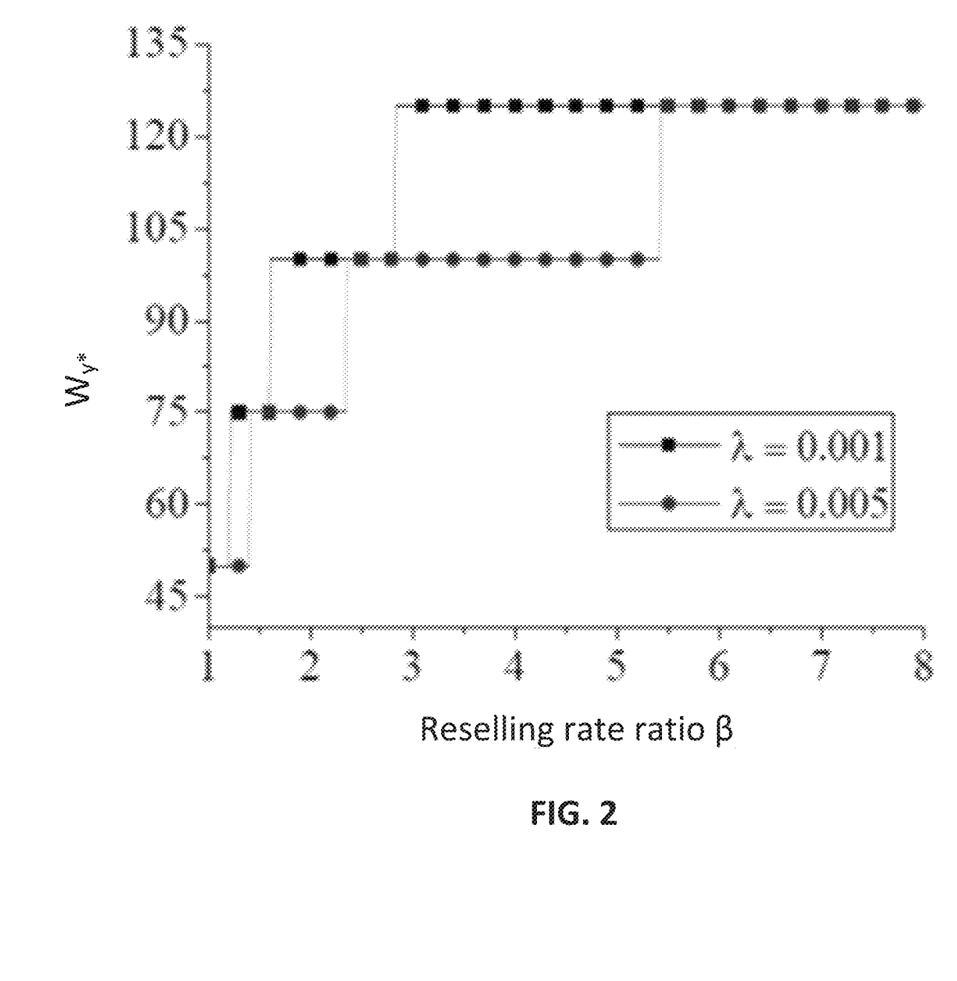
FIG. 2 is a chart illustrating an exemplary channel width and reselling rate ratio for an exemplary optical spectrum according to embodiments of the present invention.
Figure 3:
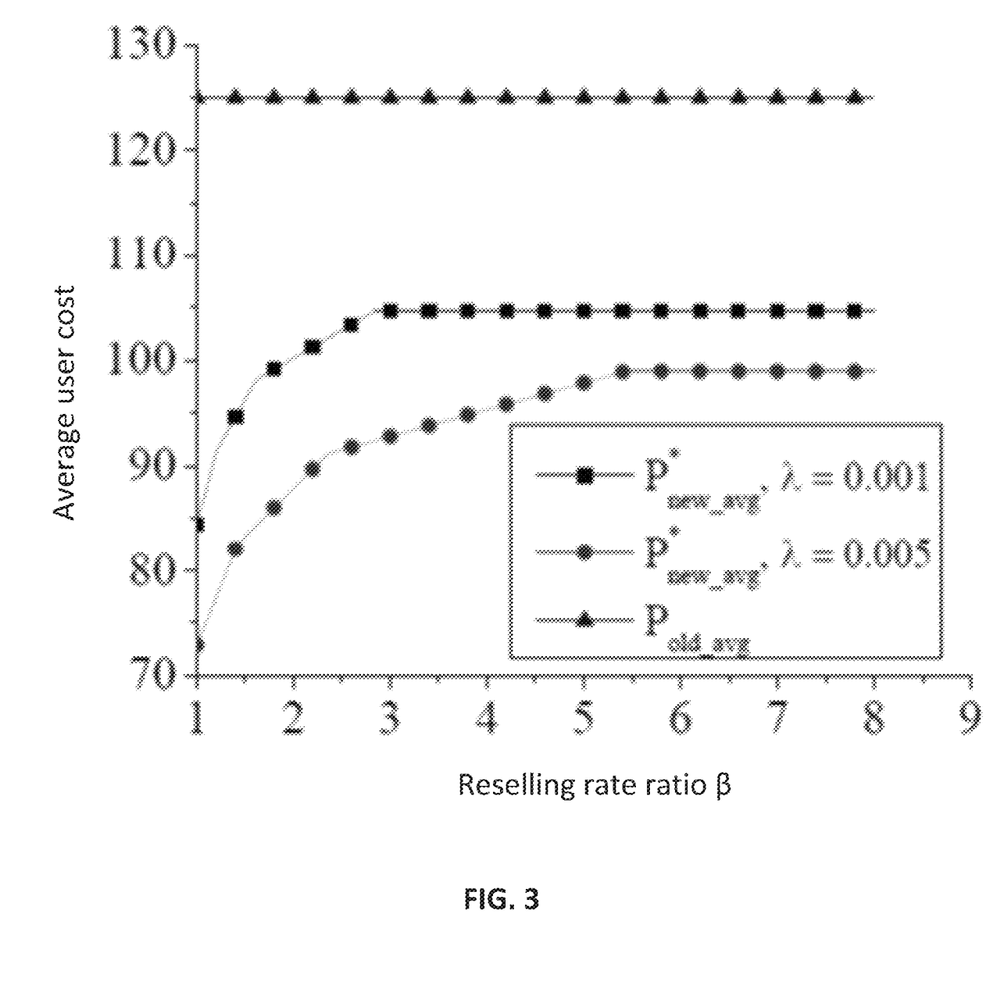
FIG. 3 is a chart illustrating an exemplary average user cost and reselling rate ratio for an exemplary optical spectrum according to embodiments of the present invention.

FIG. 2 and FIG. 3 are graphs illustrating a user's exemplary $w_{y^*}$ and average cost under different $\beta$ values, where b=400, $\alpha$=0.5, and C=$10^5$, according to embodiments of the present invention. With respect to FIG. 2, when $\beta$ increases, the users will prefer optical channels with a higher rate and larger wholesale spectrum amounts in order to avoid the high cost of extra spectrum. With regard to FIG. 3, the average user cost under the new mechanism is lower than that under the old mechanism, according to embodiments of the present invention. The new mechanism reduces the average user cost by 17.6% and 24.5% on average, when $\lambda$=0.001 and $\lambda$=0.005, respectively. Under the new mechanism, the average user cost increases when $\beta$ increases. The average user cost is constant because the user chooses the optical channel of the highest line rate as its wholesale optical channel. However, the user can still sell its unused spectrum to the carrier so the average cost under the new mechanism is still lower than that under the old mechanism, even if the user chooses the highest line rate optical channel as its wholesale optical channel.

Figure 4:
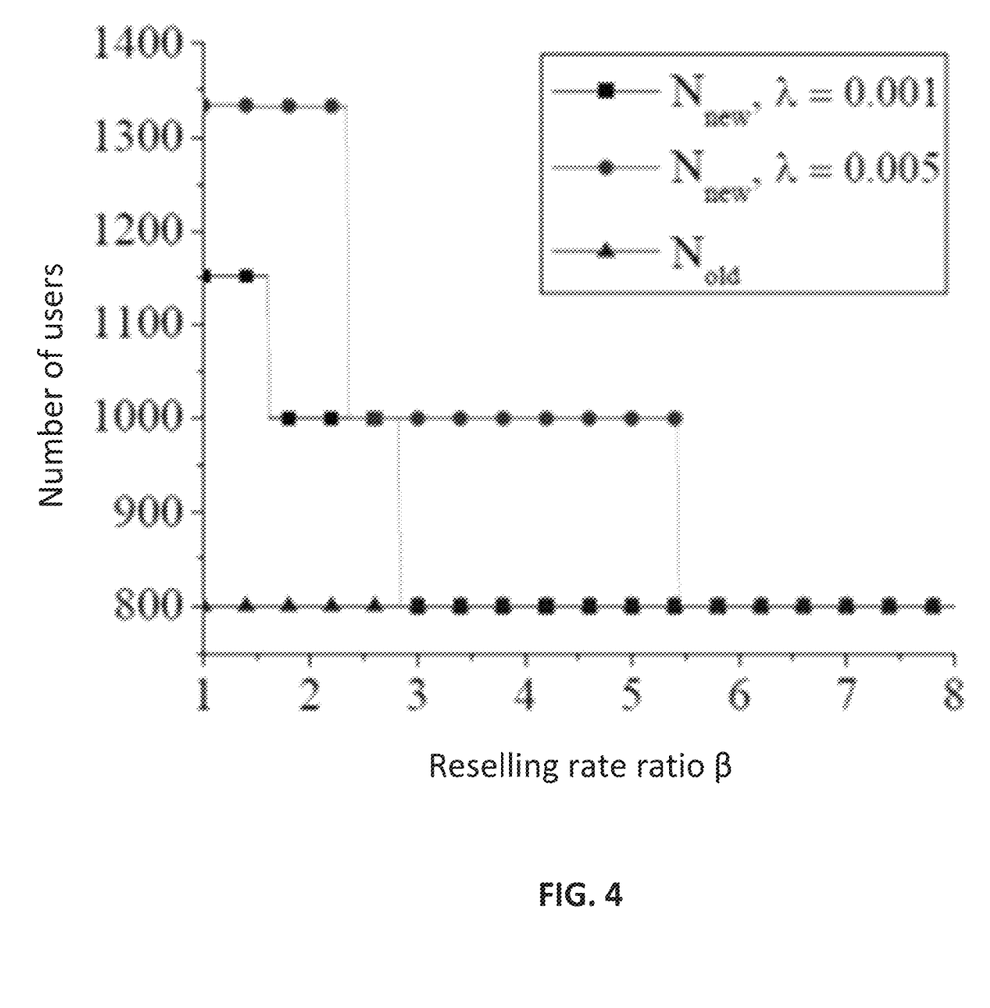
FIG. 4 is a chart illustrating an exemplary number of users and reselling rate ratio for an exemplary optical spectrum according to embodiments of the present invention.
Figure 5:
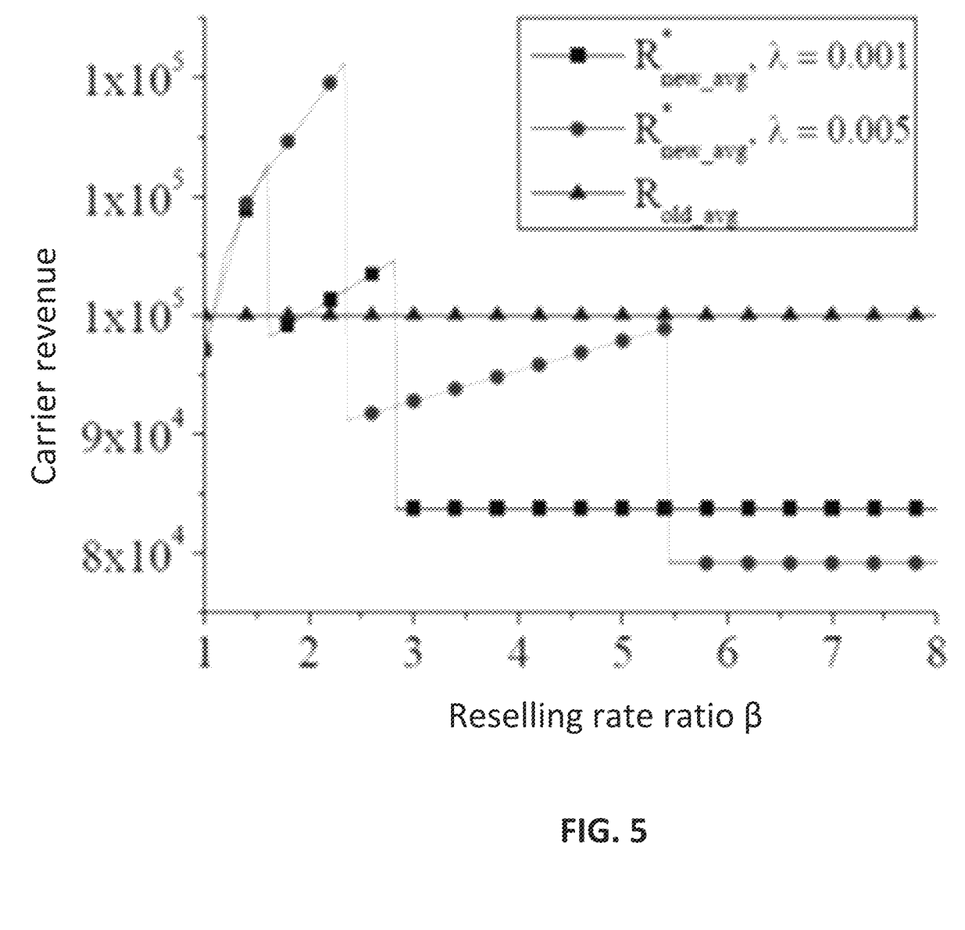
FIG. 5 is a chart illustrating an exemplary carrier revenue and reselling rate ratio for an exemplary optical spectrum according to embodiments of the present invention.

FIG. 4 and FIG. 5 illustrate the number of users an exemplary carrier can accommodate and an exemplary carrier revenue under different $\beta$ values, where b=400, $\alpha$=0.5, and C=$10^5$, according to embodiments of the present invention. With respect to FIG. 4, due to the reselling of the unused spectrum, the number of users under the new mechanism is larger than that under the old mechanism according to embodiments of the present invention. When $\beta$ is small, Eqn. (12) is dominant over Eqn. (13); however, when $\beta$ increases, the user's $w_{y^*}$ increases, and the number of users is decided by Eqn. (13) rather than Eqn. (12).

With respect to FIG. 5, the carrier revenue under the new mechanism is higher than that under the old mechanism for certain $\beta$ values. There is a large decrease when the user changes its wholesale optical channel, since when the user chooses higher rate optical channel as its wholesale optical channel, the number of users the carrier can accommodate will decrease. From FIG. 3 and FIG. 5 together, the user cost and carrier revenue under SPE can be compared. When $\lambda$=0.005, $\beta^*$=2.34, $R^*_{new\_avg}$=121282.7, $R_{old\_avg}$=$10^5$, $P^*_{new\_avg}$=91.0, and $P_{old\_avg}$=125. Using the new mechanism, the carrier revenue is increased by 21.3%, and the average user cost is decreased by 37.4%. When $\lambda$=0.001, $\beta^*$=1.60, $R^*_{new\_avg}$=112742.8, $R_{old}$=$10^5$, $P^*_{new\_avg}$=98.0, and $P_{old\_avg}$=125. Using the new mechanism, the carrier revenue is increased by 11.3%, and the average user cost is decreased by 21.6%. Thus, the "win-win" situation exists in both cases.

Figure 6:
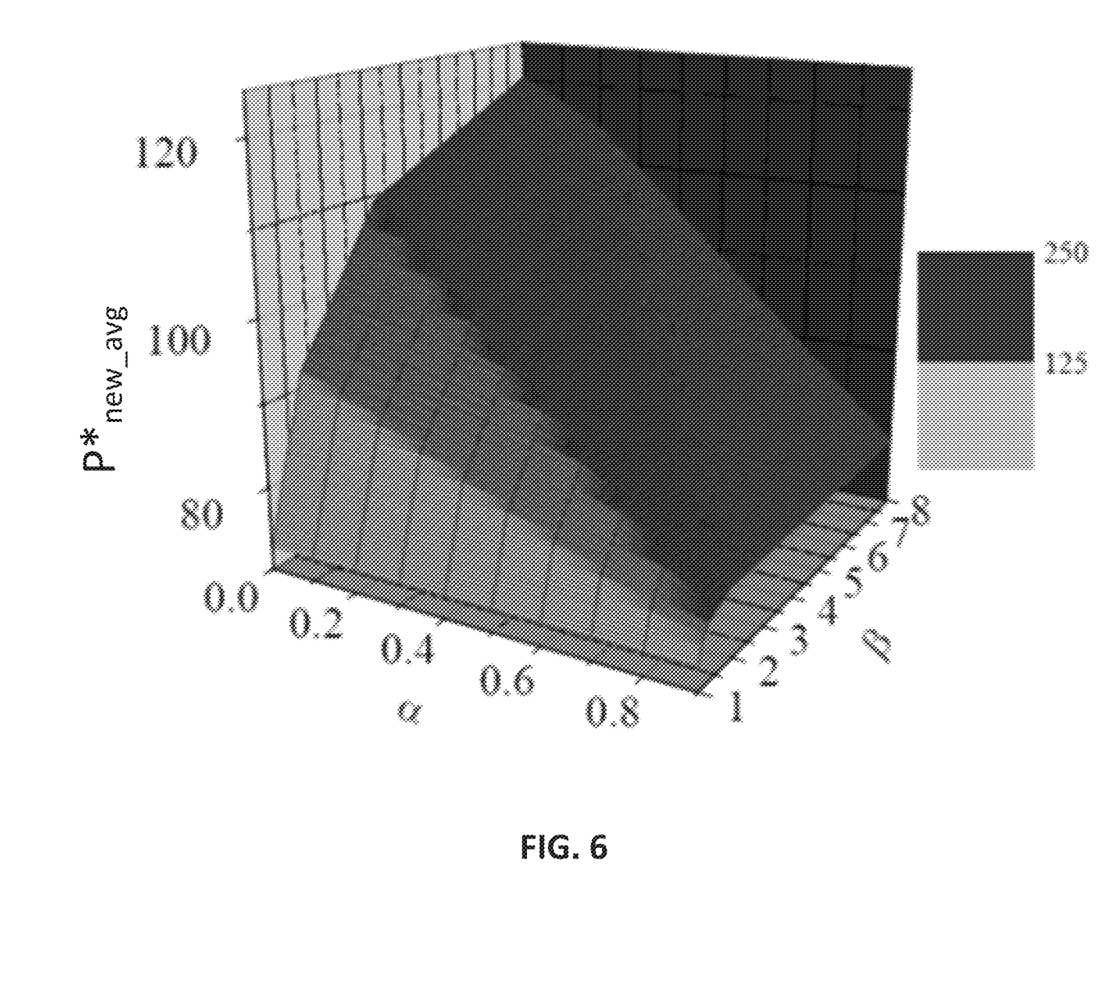
FIG. 6 is a three-dimensional chart illustrating an exemplary average user cost and reduced rate ratio/reselling rate ratio for an exemplary optical spectrum according to embodiments of the present invention.
Figure 7:
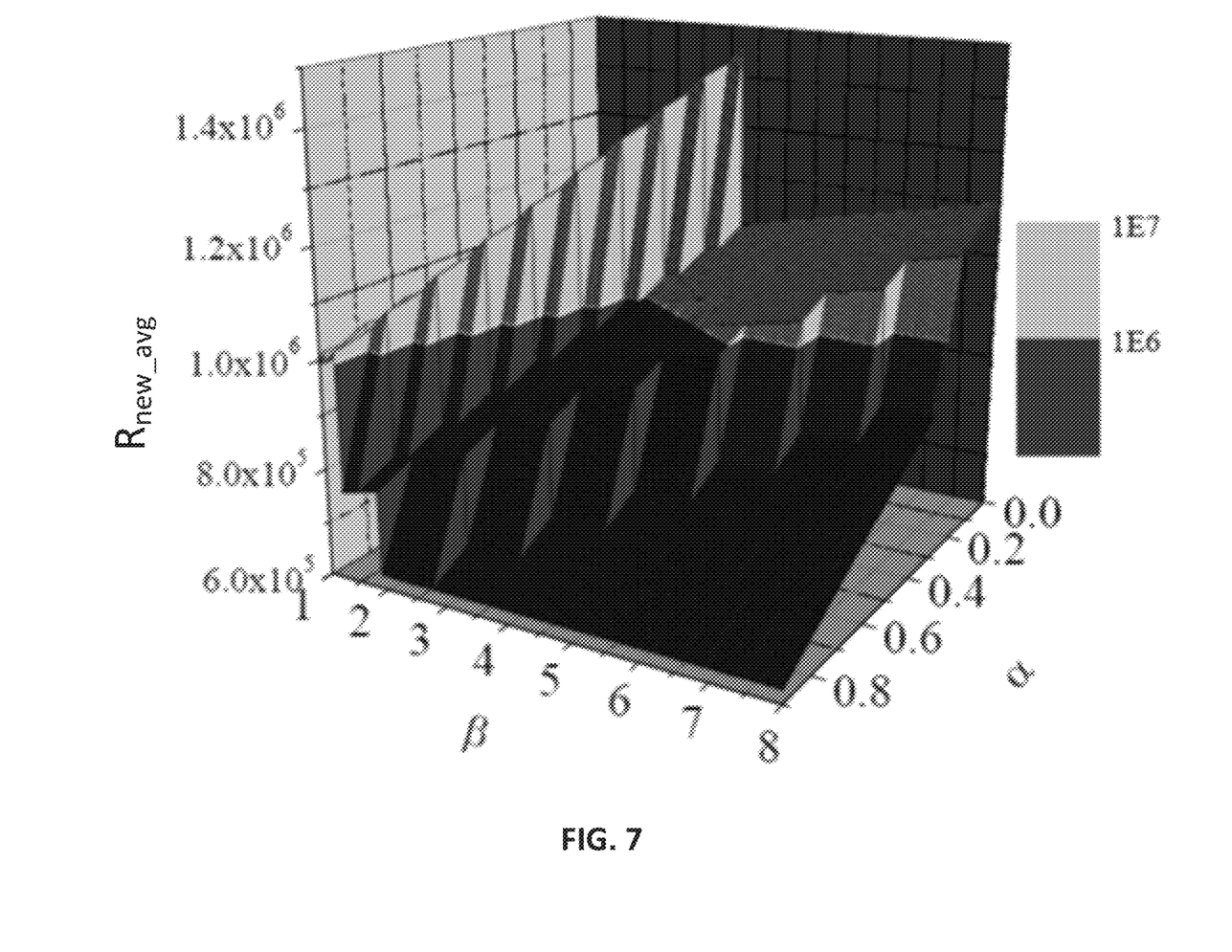
FIG. 7 is a three-dimensional chart illustrating an exemplary average carrier revenue and reduced rate ratio/reselling rate ratio for an exemplary optical spectrum according to embodiments of the present invention.

FIG. 6 and FIG. 7 illustrate an exemplary $P^*_{new\_avg}$ and an exemplary $R^*_{new\_avg}$ under different $\alpha$ and $\beta$ values, where $\lambda$=0.005, b=400, and C=$10^6$, according to embodiments of the present invention. Under these parameters, $P_{old\_avg}$=125 and $R_{old\_avg}$=$10^6$. With respect to FIG. 6, the $P^*_{new\_avg}$ values larger than 125 are shaded. No matter how much $\alpha$ and $\beta$ vary, the average user cost under the new mechanism is always lower than that under the old mechanism. With respect to FIG. 7, the $R_{new\_avg}$ values larger than $10^6$ are shaded. For each $\alpha$ value, $R_{new\_avg}$ is always larger than $R_{old\_avg}$ under $\beta^*$. Since $P^*_{new\_avg}$ is also smaller than $P_{old\_avg}$ under $\beta^*$, the "win-win" situation always exists under SPE no matter how $\alpha$ changes.

Embodiments of the present invention are thus described. While the present invention has been described in particular embodiments, it should be appreciated that the present invention should not be construed as limited by such embodiments, but rather construed according to the following claims.

What is claimed is:

1. An apparatus for allocating resources in a flexible-grid optical network, the apparatus comprising:
    a physical network terminal that is part of a first virtual link of a virtual optical network and a second virtual link of the virtual optical network; and
    a controller coupled to the physical network terminal, wherein the controller is configured to allocate a first spectrum of a first optical channel to the first virtual ink, allocate a second spectrum of the first optical channel to the second virtual link, allocate all or part of a first unused spectrum of the first spectrum to a resource pool, and dynamically allocate all or part of an available spectrum of the resource pool to the second virtual link based on an amount of traffic in the network and to reduce network congestion.

2. The apparatus of claim 1, wherein the available spectrum comprises all or part of the first unused spectrum.

3. The apparatus of claim 1, wherein a first cost associated with allocating the first spectrum and a second cost associated with allocating the second spectrum are based on a line rate of the first optical channel.

4. The apparatus of claim 1, wherein the controller is further configured to allocate a second available spectrum of the resource pool to a third virtual link.

5. The apparatus of claim 1, wherein the first virtual link is compensated for allocating all or part of the first unused spectrum to the resource pool based on a reduced rate that is lower than a wholesale rate associated with the allocating the first spectrum.

6. The apparatus of claim 1, wherein a first channel width of the first spectrum is determined based on a traffic demand of the first virtual link and a second channel width of the second spectrum is determined based on a traffic demand of the second virtual link.

7. The apparatus of claim 4, wherein the controller is further configured to allocate a first additional spectrum of a second optical channel to the first, second, or third virtual link.

8. The apparatus of claim 7, wherein a line rate of the second optical channel is higher than a line rate of the first optical channel.

9. The apparatus of claim 1, wherein the controller is further configured to change a wavelength of the first optical channel using spectrum conversion.

10. The apparatus of claim 1, wherein the first and second virtual links are coupled to the physical network terminal using a physical optical fiber.

11. A method of allocating resources in a flexible-grid optical network, the method comprising:
    allocating a first portion of a spectrum to a first link;
    allocating a second portion of the spectrum to a second link;
    de-allocating a third portion of an allocated spectrum, wherein the third portion becomes part of a resource pool comprising available spectrum; and
    allocating a fourth portion of available spectrum of the resource pool to the first or second link,
    wherein a reselling rate associated with allocating the fourth portion is higher than a wholesale rate associated with allocating the first and second portions.

12. The method of claim 11, wherein a reduced rate associated with de-allocating the third portion is lower than a wholesale rate associated with allocating the first and second portion.

13. The method of claim 11, wherein the wholesale rate is calculated to maximize carrier revenue.

14. The method of claim 11, further comprising:
    determining an amount of traffic present in the network; and
    allocating a fifth portion of the spectrum to the first or second link based on the amount of traffic.

15. The method of claim 11, wherein the reselling rate is calculated based on a number of users sharing a fiber.

16. The method of claim 11, wherein a total number of users serviced by the optical network is calculated based on at least one of a total spectrum amount of a fiber and a channel width of an optical channel.

17. The method of claim 11, wherein an average spectrum cost of the network is constant when a ratio of reselling cost to wholesale cost is above a threshold.

18. A non-transitory computer-readable medium storing computer instructions for managing resources in network virtualization over a flexible-grid optical network, that when executed by one or more processors, cause the one or more processors to perform the steps of:
    allocating a first portion of a spectrum to a first link;
    allocating a second portion of the spectrum to a second link;
    de-allocating a third portion of an allocated spectrum, wherein the third portion becomes part of a resource pool comprising available spectrum; and
    allocating a fourth portion of available spectrum of the resource pool to the first or second link,
    wherein an average spectrum cost of the flexible-grid optical network is constant when a ratio of reselling cost to wholesale cost is above a threshold.

19. The non-transitory computer readable medium of claim 18,
    wherein the one or more processors further perform the steps of:
    determining an amount of traffic present in the network; and
    allocating a fifth portion of the spectrum to the first or second link based on the amount of traffic.

* * * * *